Figure 1:
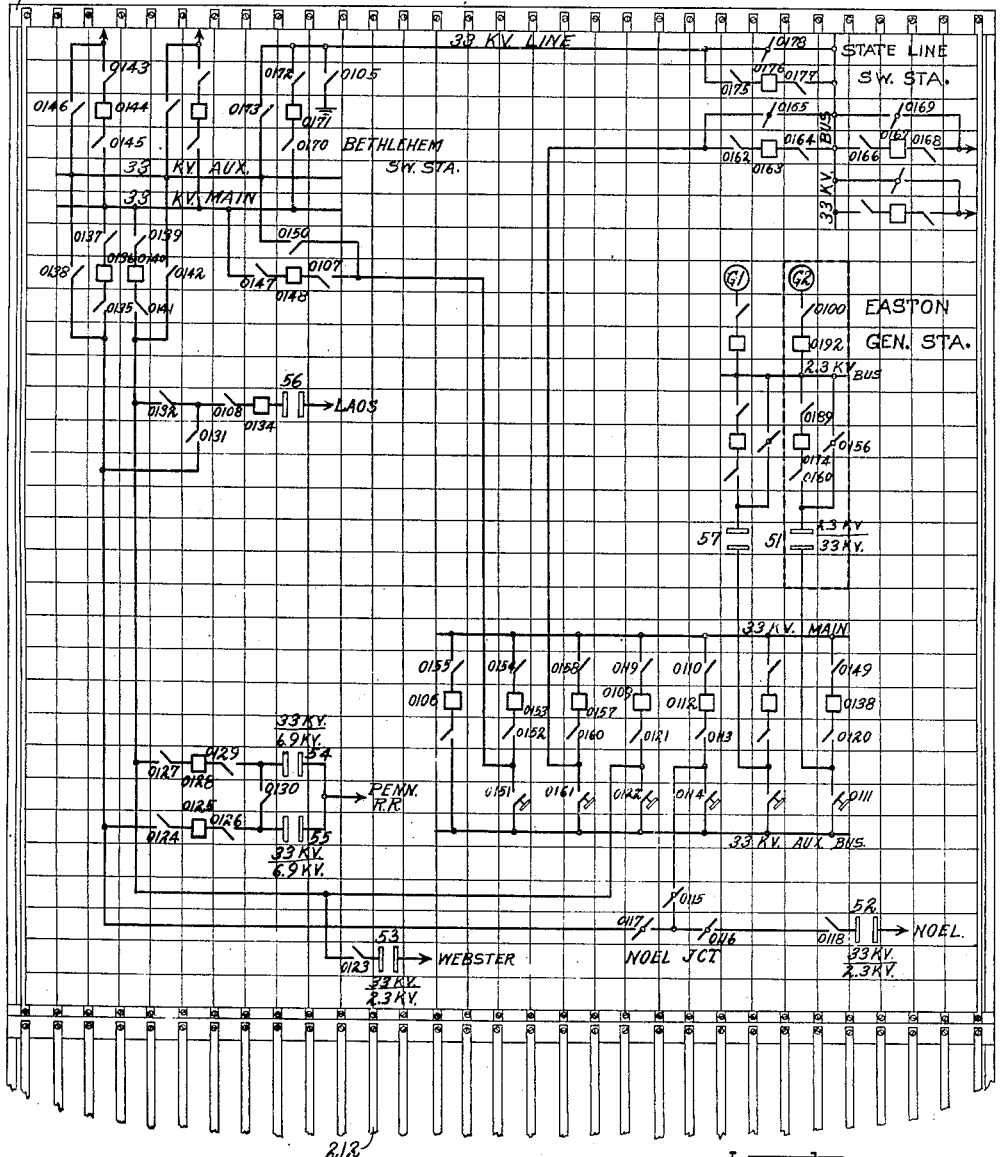

Aug. 6, 1935.   T. U. WHITE   2,010,338
DISPATCHER'S ELECTRIC DISPLAY BOARD FOR SYSTEMS OF POWER DISTRIBUTION
Filed Feb. 1, 1930   10 Sheets-Sheet 1

Inventor
Thomas U. White

Aug. 6, 1935. T. U. WHITE 2,010,338
DISPATCHER'S ELECTRIC DISPLAY BOARD FOR SYSTEMS OF POWER DISTRIBUTION
Filed Feb. 1, 1930 10 Sheets-Sheet 3

Inventor
Thomas U. White
Wm Walter Owen, Atty.

Aug. 6, 1935.   T. U. WHITE   2,010,338
DISPATCHER'S ELECTRIC DISPLAY BOARD FOR SYSTEMS OF POWER DISTRIBUTION
Filed Feb. 1, 1930    10 Sheets-Sheet 4
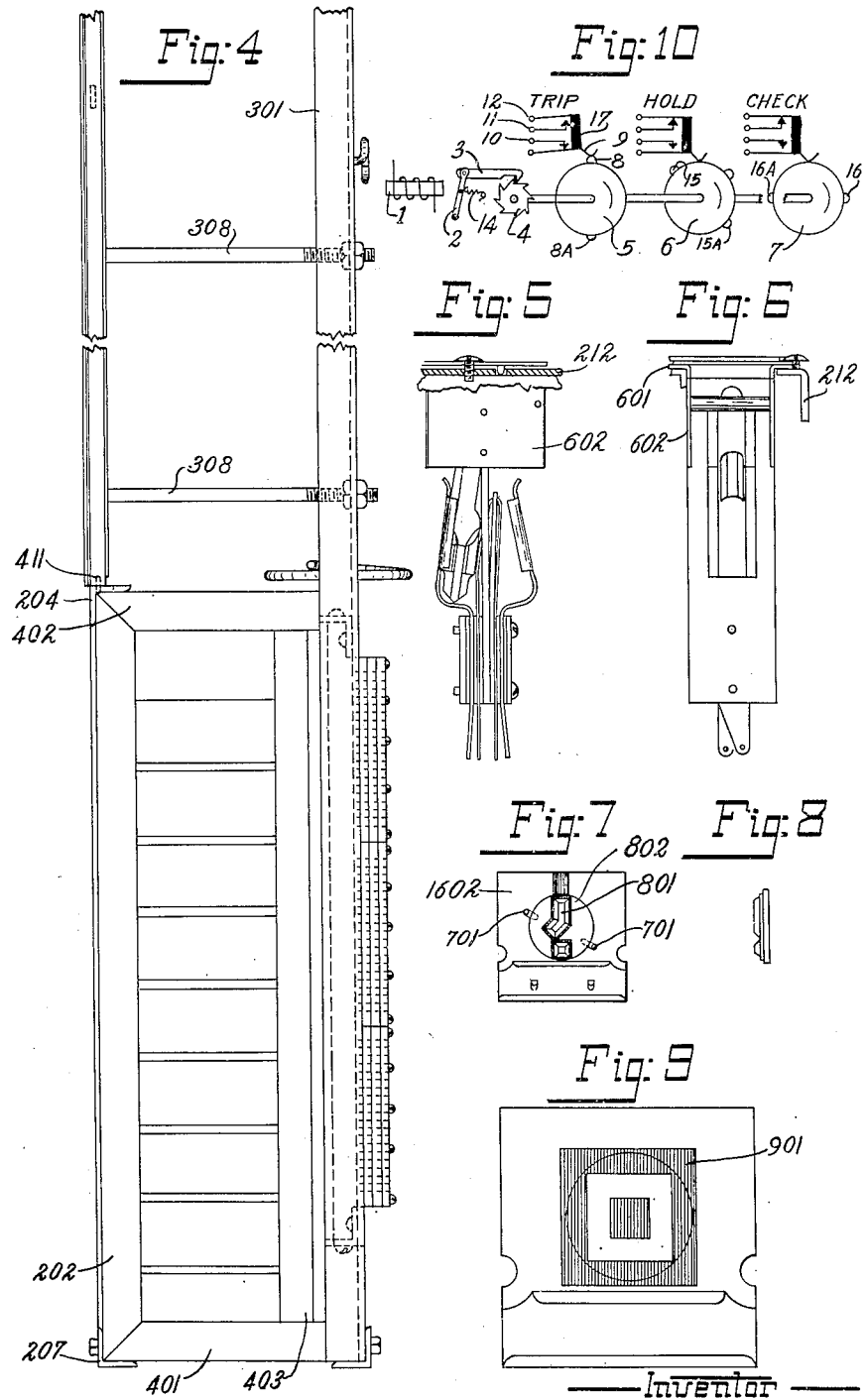
Inventor
Thomas U. White
Wm Walter Owen Atty.

Aug. 6, 1935. T. U. WHITE 2,010,338
DISPATCHER'S ELECTRIC DISPLAY BOARD FOR SYSTEMS OF POWER DISTRIBUTION
Filed Feb. 1, 1930 10 Sheets-Sheet 5
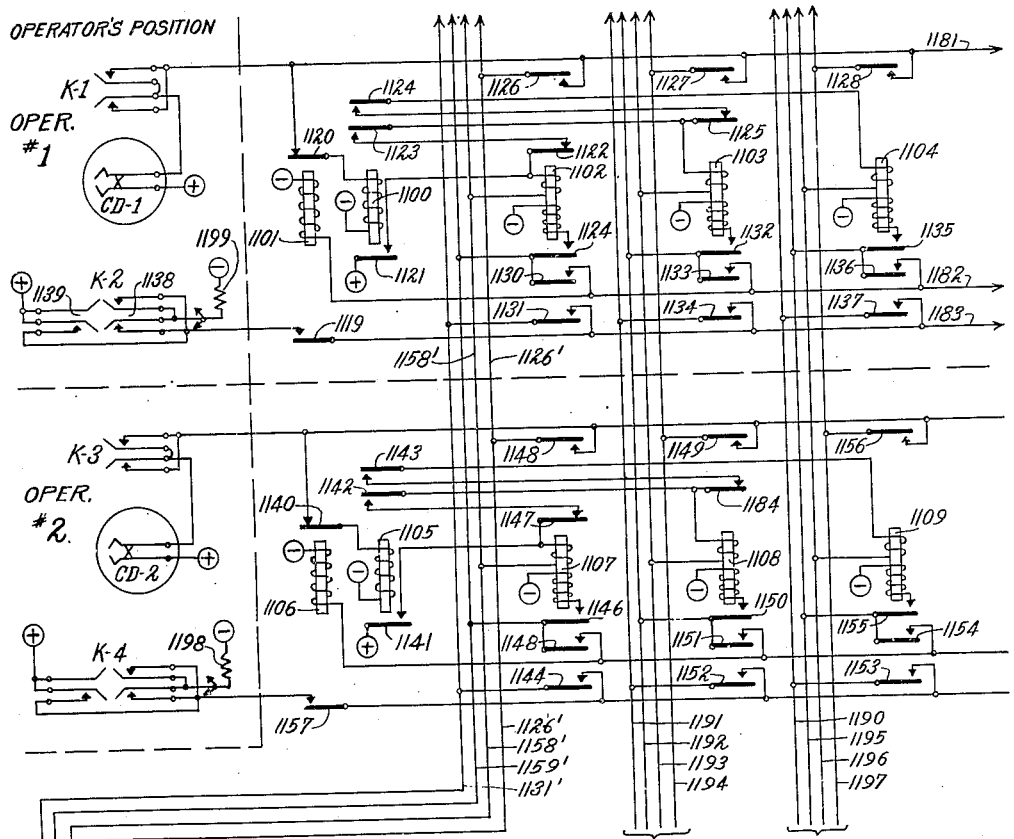
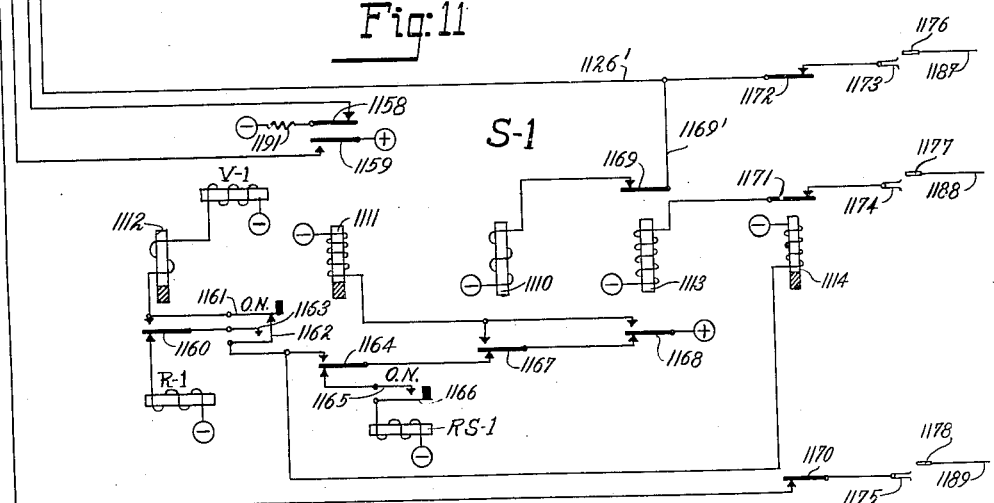
Fig. 11
Inventor
Thomas U. White Aug. 6, 1935.  T. U. WHITE  2,010,338
DISPATCHER'S ELECTRIC DISPLAY BOARD FOR SYSTEMS OF POWER DISTRIBUTION
Filed Feb. 1, 1930   10 Sheets-Sheet 6

Inventor
Thomas U. White

Aug. 6, 1935.　　　T. U. WHITE　　　2,010,338
DISPATCHER'S ELECTRIC DISPLAY BOARD FOR SYSTEMS OF POWER DISTRIBUTION
Filed Feb. 1, 1930　　　10 Sheets-Sheet 8

Fig. 14

Inventor
Thomas U. White

Aug. 6, 1935. T. U. WHITE 2,010,338

DISPATCHER'S ELECTRIC DISPLAY BOARD FOR SYSTEMS OF POWER DISTRIBUTION

Filed Feb. 1, 1930 10 Sheets-Sheet 9

Inventor
Thomas U. White

Aug. 6, 1935. T. U. WHITE 2,010,338
DISPATCHER'S ELECTRIC DISPLAY BOARD FOR SYSTEMS OF POWER DISTRIBUTION
Filed Feb. 1, 1930 10 Sheets-Sheet 10

Inventor
Thomas U. White
Wm Walter Owen Atty

Patented Aug. 6, 1935

2,010,338

UNITED STATES PATENT OFFICE 2,010,338

DISPATCHER'S ELECTRIC DISPLAY BOARD FOR SYSTEMS OF POWER DISTRIBUTION

Thomas U. White, Oak Park, Ill., assignor, by mesne assignments, to Associated Electric Laboratories, Inc., Chicago, Ill., a corporation of Delaware Application February 1, 1930, Serial No. 425,121

7 Claims. (Cl. 177—311)

My invention relates in general to display board systems, and more particularly to that type now generally called dispatcher's boards for systems of power distribution.

Present day operating conditions with utilities supplying systems of power distribution usually require that at certain points in the system, a centralized load dispatching or power directing office be established. This office becomes the master eye of the centralized system.

This power directing office is called the system operating or load dispatching office and the operators are called system operators or load dispatchers.

It is the duty of the system operator to coordinate all the utility departments to bring about continuity of service with highest economy of operation. His general supervision over work in progress is essential to continuity of service and human safety, as he authorizes the operation of all switching equipment necessary to permit work on lines or physical equipment, and establishes all "blocking" or "hold" conditions on equipment to prevent its movement without his authorization or "clearance orders".

The system dispatcher's activities commence at the generating station boilers, embrace the generating units with their auxiliaries, traverse the transmission lines, include the substation and its apparatus, and end out on the distribution circuits. He is responsible at every moment for the generation, transmission and distribution of the proper amount of power load. He computes the demand to be met, schedules it on his generating stations and interconnections with other systems, ascertains that each station and interconnection will provide sufficient electrical capacity to carry the load, and that there will be sufficient reserve energy to compensate for the loss of the largest source of supply available. He must keep in mind the condition of power equipment and their ability to carry loads.

In the old days his domain was small and his system was comparatively simple, and about all he needed was a blue print showing the various switching elements and their connections, and proper communicating facilities with the switching stations, generating plants, etc., and he was all ready to go to work to direct the operation of the system.

The rapid growth of the industry, however, has brought about the use of much more elaborate switching circuits and equipment, and he finds his system decidedly complicated, it being no longer possible to rely upon the old style blue print as previously used. This situation has brought about the introduction of the system dispatcher's control board.

These boards have in the past been constructed of asbestos board, wood panel, or the like, usually arranged for wall mounting in the dispatcher's offices. On this board the power system is represented symbolically by a one line diagram of the connections of the equipment and circuits comprising the system of power distribution.

The symbols and legends used in the construction of such boards have become somewhat standard. The electrical apparatus committee of the National Electric Light Association has suggested most of these symbols as now generally adopted by the power companies in this country.

Only a few of the many symbols used are shown in the drawings which form a part of this specification and legends are given to define their meaning, in the circuits used in illustrating this invention.

Many types of system diagrams or dispatching boards have been constructed, some of which employed the use of colored plugs, to indicate the position of the physical switching equipment represented symbolically on the diagram. Others were equipped with lamp signals usually provided with some sort of manually operated key controls. These dispatching boards have usually been built by the utility operating departments to partially meet the requirements of some particular system, and are soon outgrown or obsoleted by changes made to the prior system, which could not be incorporated on the dispatching board due to its type of construction.

The circuit diagrams of the power system are subject to constant modification, to care for additions, removals and changes to the system apparatus, and feeder connections to customers, etc. The dispatching boards as designed and constructed in the past did not readily permit of such changes.

In addition, with the increase in the requirements for efficient centralized operation, there comes a necessity for a large variety of signal indications, in systems of this character, not possible on dispatching boards used in the past.

One object of this invention is to provide a dispatcher's board with an interchangeable face equipment of a type permitting interchangeability to the smallest unit used in the construction of the one line diagram. That is, to so construct the face equipment of readily removable and interchangeable parts as to make possible reconstruction of the one line diagram comprised of the line circuits by use of escutcheons with symbols representing power equipment, and the other units necessary to take care of changes in circuit connections, apparatus additions, increase to circuits, etc., as required to keep the dispatcher's board up-to-date, to at all times exactly represent the physical equipment and circuits comprising the system of power distribution.

Another object of the invention disclosed herein, is to provide signalling devices and circuits capable of indicating any one of a plurality of indications to show the actual conditions of power switching equipment as represented symbolically on the one line diagram of the dispatcher's board.

Still another object is to provide these indications in such manner as to prevent falsifying signals in case of loss of energy on the signalling circuits of the dispatcher's display board.

Another object of this invention is to provide circuits and apparatus comprising a means of selectively controlling the indicating devices of this type of dispatcher's display board.

Another object of this invention is to provide a selective equipment for controlling indicating devices on a dispatcher's board, which will permit the use of a single group of selectors from a plurality of dispatcher's positions.

Another object of this invention is to provide symbols representing switching apparatus combined with electric signal circuits in such manner that each such symbol can be made to indicate both the type of switch, and its position.

Still another object of the invention disclosed herein is to provide certain guiding tell-tale indications on the one line diagram which are automatically operated as a result of the positioning of the devices which control the switch signal indications to apprise the dispatcher as to the condition of various circuits represented on the board, due to the operation of such switch signal devices.

The above noted and other less important objects of the invention not specifically mentioned will be brought out later in the detailed description and appended claims.

The drawings, comprising Figs. 1 to 17, inclusive, show sufficient apparatus and circuits to illustrate my invention, and to enable it to be readily understood.

Figure 15:
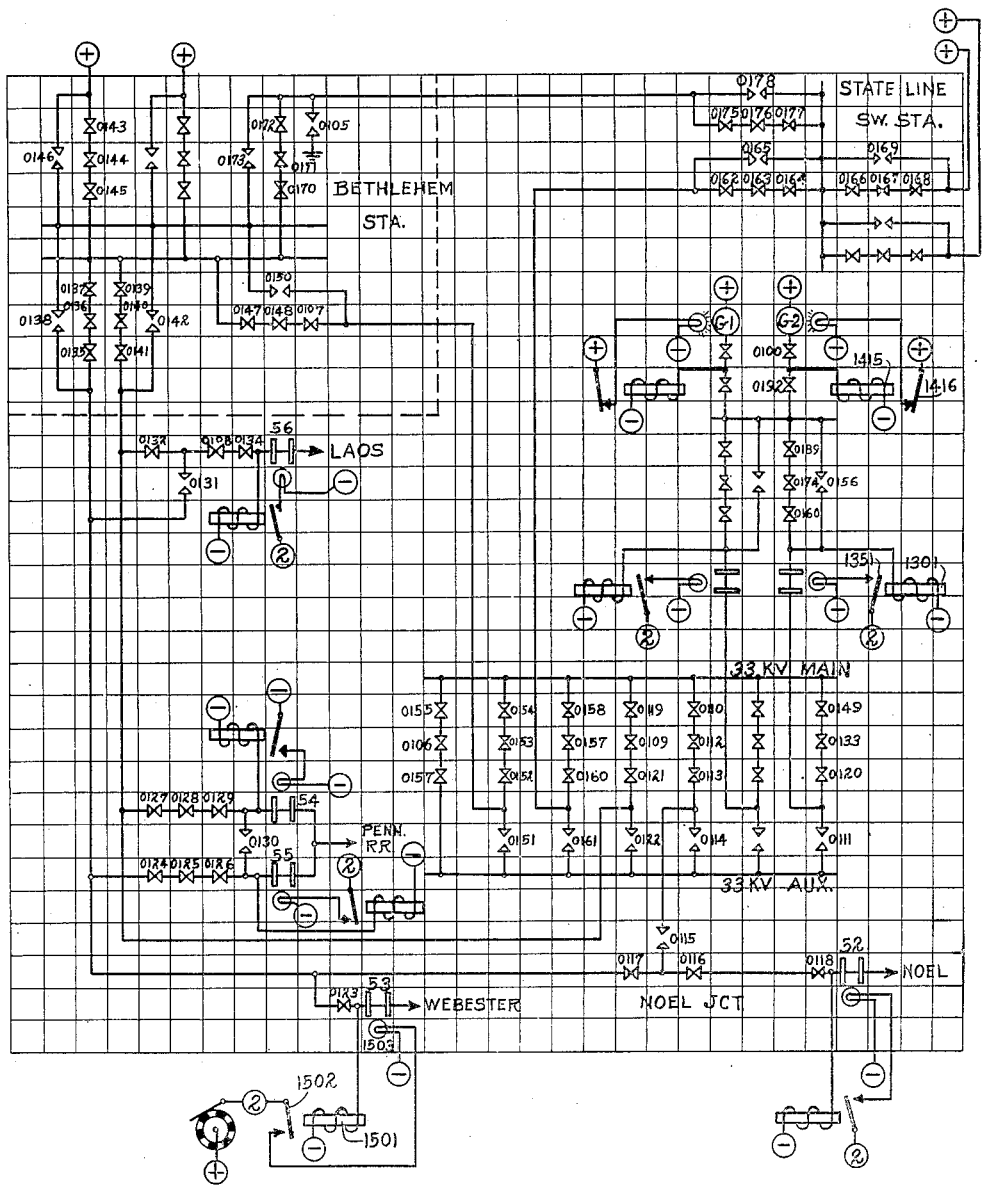
Figures 16, 16A, 17:
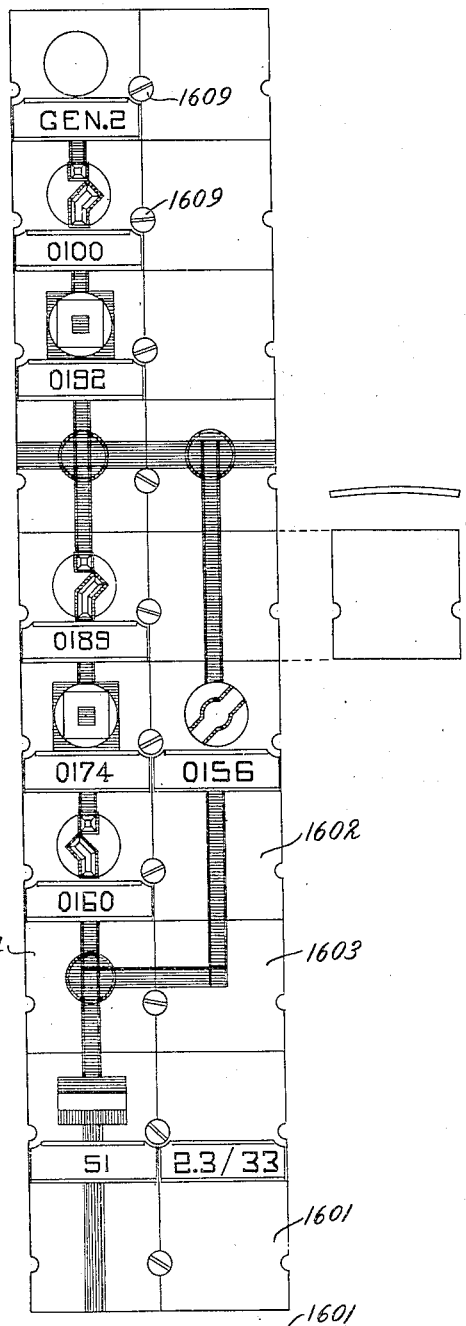

Figs. 1 to 9, inclusive, and Figs. 16 and 17, show details of the mechanical construction of the invention. Fig. 10 diagrammatically illustrates the notching type relay used in practicing the invention, and Figs. 11 to 15, inclusive, illustrate the circuits used in practicing the invention.

The operation of an installation of equipment of the character about to be described requires, in addition to the dispatcher's board and disclosed circuits, suitable communication facilities to enable the dispatcher to communicate with the various power plants, and switching stations or locations at which points there are men qualified to carry out the switching instructions and orders issued from the dispatcher's office.

The only equipment required at the dispatcher's position for practicing this invention comprises the calling dial CDI and keys K1 and K2 such as shown on Fig. 11. The remainder of the equipment used in practicing this invention is not located at the dispatcher's position, but is ordinarily mounted upon the dispatcher's board in the same room.

Referring now more particularly to Figs. 1 to 9, inclusive, and Figs. 16 and 17, the mechanical construction of the invention will be more fully described.

Figure 2:
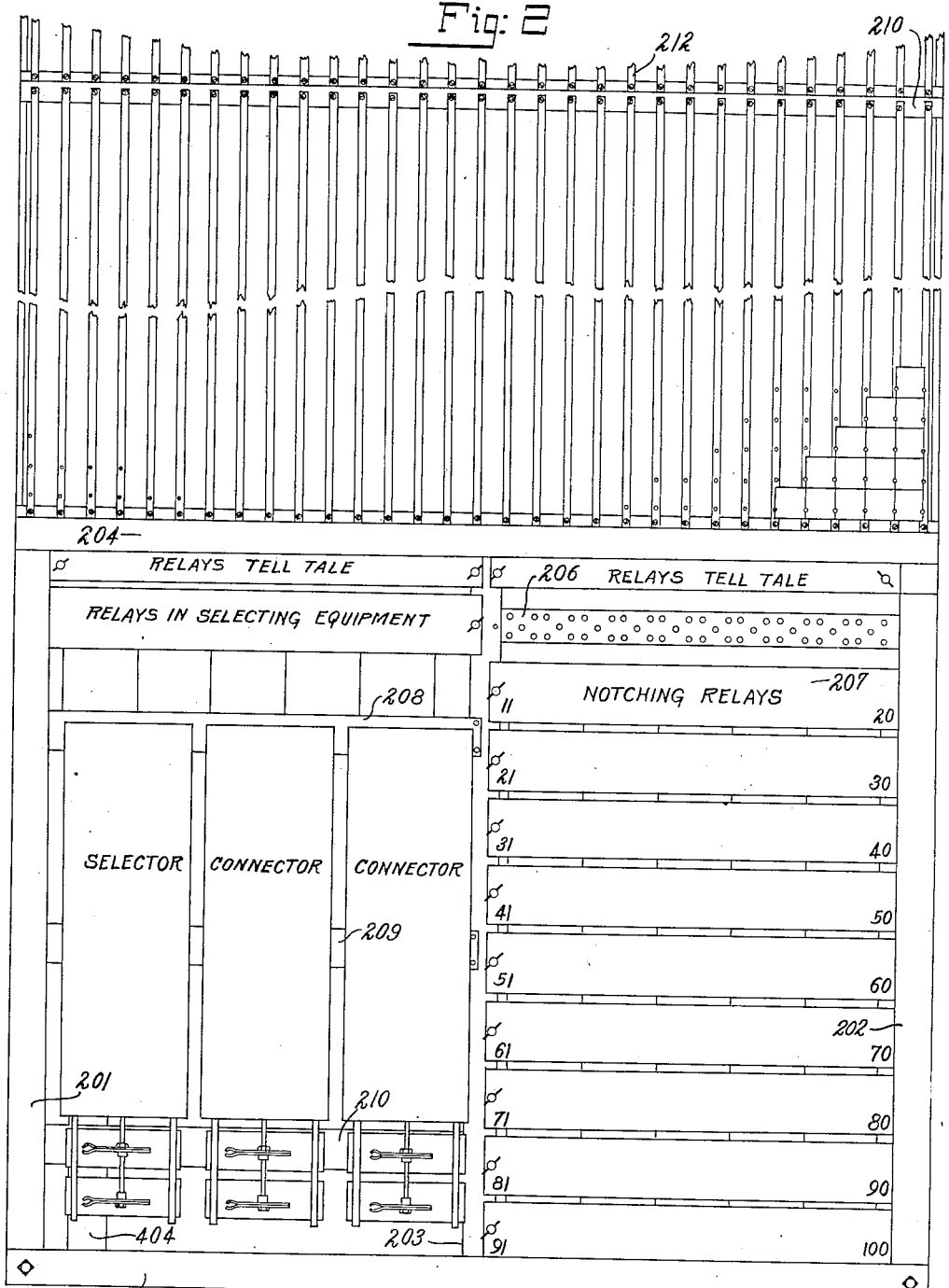

Figs. 1 and 2 taken together with Fig. 1 above Fig. 2 illustrates a typical front view of the supporting frame work showing one method of mounting the display board equipment. This is a front view of a supporting frame work with certain of the parts broken away to better show the details of construction. The dispatcher's board comprises a number of these supporting frame work units, which are fastened directly to the floor of the operating office in either a straight line or a semi-circular arrangement.

The main portion of each supporting framework unit comprises suitable vertical members 201, 202, 203, 301, 302, and 403; and of horizontal members 204, 205, 303, 304, 305, 401, and 402, respectively, secured together in any desired manner. Secured to the horizontal members 304 and 305, at the back of the frame are terminal block assemblies 306 where all apparatus on the board is interconnected as required.

Secured to the vertical members 203, 403, and 404 are a plurality of horizontal relay mounting strips, there being one such strip, 206 shown. The remaining similar strips are shown with their covers 207 in place. To the left and below certain of the relay mounting strips are horizontal strips 208, 209, and 210 upon which are mounted the selector and connector switches.

The face equipment upon which the one line diagram is painted is built up into signal panel units arranged for mounting upon the supporting steel frame described.

These signal panel units are placed upon the front horizontal members 204 of the supporting frames, and are maintained in proper relation thereto and to the adjoining units by dowels 411 and by adjustable studs 308. These studs are made adjustable so that the signal panel units may be shifted about and lined up to permit the installation of escutcheons at the joints of adjacent signal panels.

Each signal panel unit comprises a frame 210 measuring approximately thirty inches square and is equipped with small angle irons 212 which are drilled and tapped for mounting nine hundred one-inch square escutcheons, which may be blank, equipped with lamp signal units, or embossed and painted to represent circuits as required in building up the one line diagram symbolic of the connections of the power equipment. A few of these escutcheons are shown in place on the frame work unit shown in Fig. 2.

The construction of the escutcheons comprising the face equipment is shown in detail in Figs. 5 to 9, inclusive, and Figs. 16 and 17.

The escutcheons 1601 are mere punchings, as are those such as 1603 and 1604. These latter ones, however, are embossed, as illustrated in Fig. 17, and the embossing is painted a color depending upon the voltage of the circuit they represent.

Each lamp signal escutcheon is half the thickness of the plain and embossed ones so that the bent over portions 601 of a lamp socket frame 602 provided for, holding two lamps, as illustrated in Figs. 5 and 6, may be secured to the angle irons 212 and the escutcheons of both types maintained flush on the face side of the board.

The lamps are mounted between spring clips insulated by "bakelite" or other insulating material in the pile up of assembly springs, in such manner that the tips of the two lamps meet directly back of a molded glass symbol mounted in the face plate of the lamp signal unit. One of the switch board lamps is made of natural colored red glass or clear glass dipped in a red coloring matter, and the other switch board lamp is made of natural colored green glass or a clear glass dipped in a green coloring matter. Clear glass lamps or amber colored lamps are used in some instances in order to obtain the variety of signals necessary.

Each escutcheon used in conjunction with lamps, contains a molded glass symbol and a card holder type designation strip. As illustrated in detail in Fig. 7 the molded symbol is held in the opening in the face plate by means of two small pins 701 spun into holes in the face plate and bent around the symbol when it is in place. In order to enable the one line diagram to be followed even though the electrified signals are not lighted, that portion 801 comprising the symbol, is raised and left transparent; the portion thereof immediately surrounding such raised portion is painted a color corresponding to the color of the circuit in which it is included; while the remainder of the glass is painted the same color as the escutcheon. This is clearly brought out in Figs. 7 and 9. In the case of the symbol shown in Fig. 9 the painted line 901 surrounding the symbol even extends over on the escutcheon itself, whereas in the case of a symbol such as the one shown in Fig. 7, representing a hand operated disconnect, only the portion 802 of the molded unit is painted in harmony with the one line diagram, the remainder being of the same color as the escutcheon. Each face plate containing a molded symbol is also provided with a number card holding member as clearly shown in Figs. 7, 9, and 16; and all of the escutcheons have notched out portions thru the medium of which they are held in place on and readily removed from the angle iron supports.

By the arrangement shown it will be seen that all escutcheons of the entire face equipment may be moved about in a checker board fashion to care for changes and additions to the one line diagram as the various changes are made to the equipment comprising the system of power distribution; i. e., a blank escutcheon can be replaced by an embossed escutcheon or a lamp signal equipped escutcheon at any point in the face equipment of each signal panel. No lamp signal equipment, however, can be installed where the signal panels are joined together at the various junction points; but a one inch square blank or embossed escutcheon may be installed at the junction of the signal panels. This arrangement makes the entire face equipment interchangeable and provides a means of rapidly shifting about the entire face equipment as necessary to care for changes and additions to the one line diagram, which it will be appreciated, is very desirable. The screws 1609 used in mounting the one inch square escutcheons on the signal panel are of a special oval head type and are inconspicuous. These screws are also used to support the various line, bus, and circuit designations, as necessary to add intelligence to the one line diagram.

After the assembly of the entire face equipment, with blanks substituted for those containing molded symbols, it is first sprayed with a background of colored lacquer, usually dark green or black. The one line diagram is then painted between the embossed lines on the escutcheons in different oil colors, used to represent voltages, and blank escutcheons replaced by those equipped with lamps where required. This makes a diagram of striking clearness. The embossing prevents the paint from running or spreading over the surface of the escutcheons as may be readily understood. The embossed plate may be removed and the colored lines erased and changed without injury to the background finish.

It is apparent from the description given so far that the lamp arrangement with proper controlling circuits provides a means of electrifying the one line diagram in such manner as to provide indications for guiding the dispatcher in issuing switching orders. The various lamp signals are connected to individual controlling circuits by means of flame-proof cross connecting wires run through jumper rings down to terminal strips at the bottom of each supporing frame in a manner similar to that used on telephone exchange distributing frames, thus making possible the connection of any lamp signal unit to any control circuit by shifting jumpers or cross connecting wires at the rear of the board.

It is believed, that from the foregoing description the mechanical construction of the equipment used in practicing the invention will be readily understood, and its electrical operation will now be described in detail.

In describing the operation of the various signalling circuits in the one line diagram, that portion of the power system which is represented symbolically by the one line diagram located on the escutcheons of the face equipment as shown in Fig. 1 will be used. It is to be understood that two lamps, one red and one green are mounted in the lamp signal unit in each case, except that one red lamp only is mounted in the lamp signal unit representing the generators G1 and G2 and in the lamp signal units representing the transformers 51 to 57, inclusive.

In order to provide a signalling system which will provide sufficient information for the guiding of the power dispatcher intelligently, it is necessary to choose certain signal indications which will be standard for the installation and representative of the electrical conditions of the various switching elements comprising the power network. The choice of these signalling indications depends to a great extent upon the type of service given by the utility to its subscribers, and to some extent upon the importance of the transmission lines and their connections with reference to the system of distribution.

For the purpose of illustrating this invention the following signalling indications are chosen, which indications incidentally are those usually adopted as standard for the type of system illustrated by the one line diagram shown in Fig. 1. (A) A closed switch is represented when neither of the two lamps in the lamp signal unit is energized and the signal is, therefore, dark. The closed switch is one manually or electrically operated to a position to effect the closing of contacts so as to permit a flow of electrical energy through said contacts to terminals or lines. (B) The open switch, tripped switch, and tripped free switch have a single indication and the switch is considered in this positon when the lamp signal unit shows the raised portion of the molded glass symbol illuminated by the green lamp energized.

When the switch is tripped or opened it is, of course, understood that the electrical circuit through the contacts of said switch mechanism are in a position to interrupt a flow of electrical energy through the contacts of the switch.

(C) A held or blocked switch is one which has been opened manually or tripped electrically and either mechanically blocked by some insulating device, or red tagged and posted against reclosing, except on instruction from the party given the clearance on the switch as designated on the tag.

A hold card consisting of a red tag containing full information as to the purpose for which the switch has been removed from the service or has been opened and tagged is usually placed on every switch where the electrical circuit has been opened or clearance given on apparatus or circuits on which work is being done.

The dispatcher is held responsible for the giving of clearances on all lines or switching elements in the system and it is imperative that he have before him an indication of such clearances or hold cards. When the raised portion of any switch symbol is illuminated steady red by the energized red lamp, it shall be considered that the switch is opened or tripped under hold card conditions, as described in this paragraph.

(D) In order to indicate the condition of generating units we will consider that when the generator units such as G1 and G2 are in a position to supply energy to the system that the lamp signal designated G1 or G2 will be illuminated by the red lamp energized. When the generator is shut down or the boiler is down to an insufficient pressure to supply energy to the system this condition will be represented by a dark symbol.

(E) In order to indicate the condition of the transformer banks which transform the energy for transmission lines or at points of distribution, certain relay circuits have been provided which will indicate when the transformers are live from either direction and when they are dead. A dark signal at a transformer bank point will be used to indicate that the transformer is hot or live. When the transformer is cold or dead the red lamp signal is intermittently energized at high speed so as to cause a flash on the symbol representing the transformer bank.

(F) It is desirable to indicate on the dispatcher's board when he has issued a telephonic instruction for the operation of any switch unit in the system. This is particularly true when more than one operator, as is usually the case, is issuing instructions for the operation of switching equipment. An additional indication has, therefore, been provided which is used to indicate that an instruction has been issued to a remote or distant substation operator for the opening, closing, or blocking, of switching apparatus.

Having defined the various signal indications that it is desired to obtain, the circuits and means which enable the dispatchers to set up these various indications on the dispatcher's board and their method of operation will now be described. As stated heretofore the lamp signal indications on the generator symbol and on the transformer bank symbols are controlled by contacts on relays, connected in a manner which will be hereinafter described in detail. However, the lamp signal indications on all switch points symbolic of the various types of switching elements comprising the power system, are controlled by a notching relay type of device, such as that shown in Fig. 10.

The mechanical construction of this device is somewhat similar to that described in the pending United States application of Theodore C. Riebe, C. E. Lomax, and H. S. Obergfell, Serial No. 391,326, filed Sept. 9, 1929.

In order to make clear the operation of the notching relay used in practicing this invention, however, its operation and circuits will be further described.

The device comprises an electro-magnet 1, an armature 2, and ratchet lever 3, which engages the notched wheel 4. The ratchet wheel 4 is attached to a common shaft in such manner as to drive the fibre discs 5, 6, and 7, and to rotate these discs in a step-by-step movement each time the electro-magnet 1 is energized. A retractile spring 14 returns the armature 2 to normal position after each energization and deenergization of the operating magnet 1. The ratchet wheel 4 has eight teeth, and the operating magnet 1 must be energized and deenergized eight times in order to cause one complete revolution of the fibre cams.

The pins, 8 and 8A, 15 and 15A, 16 and 16A, are so located on the circumference of the fibre cams that they will engage and operate the spring combinations controlling the electrical circuits of the device at each four steps in the operation of the ratchet wheel 4. In Fig. 10, the pin 8 is shown in the position it assumes when it engages the spring pile-up armature 9. It will be seen that when the pin number 8 engages the armature 9 of the spring pile-up that spring contacts on armature 9 and its upper contacts are closed, and that a circuit is broken at armature 12 and its spring contact 11.

It will be seen that each of the cam wheels has two projections or pins directly opposite each other on the circumference of the fibre wheel. Each wheel is mounted so that its cams or pins will be displaced one eighth of a revolution with respect to the adjacent cam. Thus as the switch is set the spring combinations will be operated in order one after the other. Since there are eight positions which can be assumed by the cam and but three sets of operating spring mechanisms there is one position in which the springs are not in an operated position. That is, none of the spring combinations have their armatures engaged by the pin or projection on the fibre cam at this point.

Figure 13:
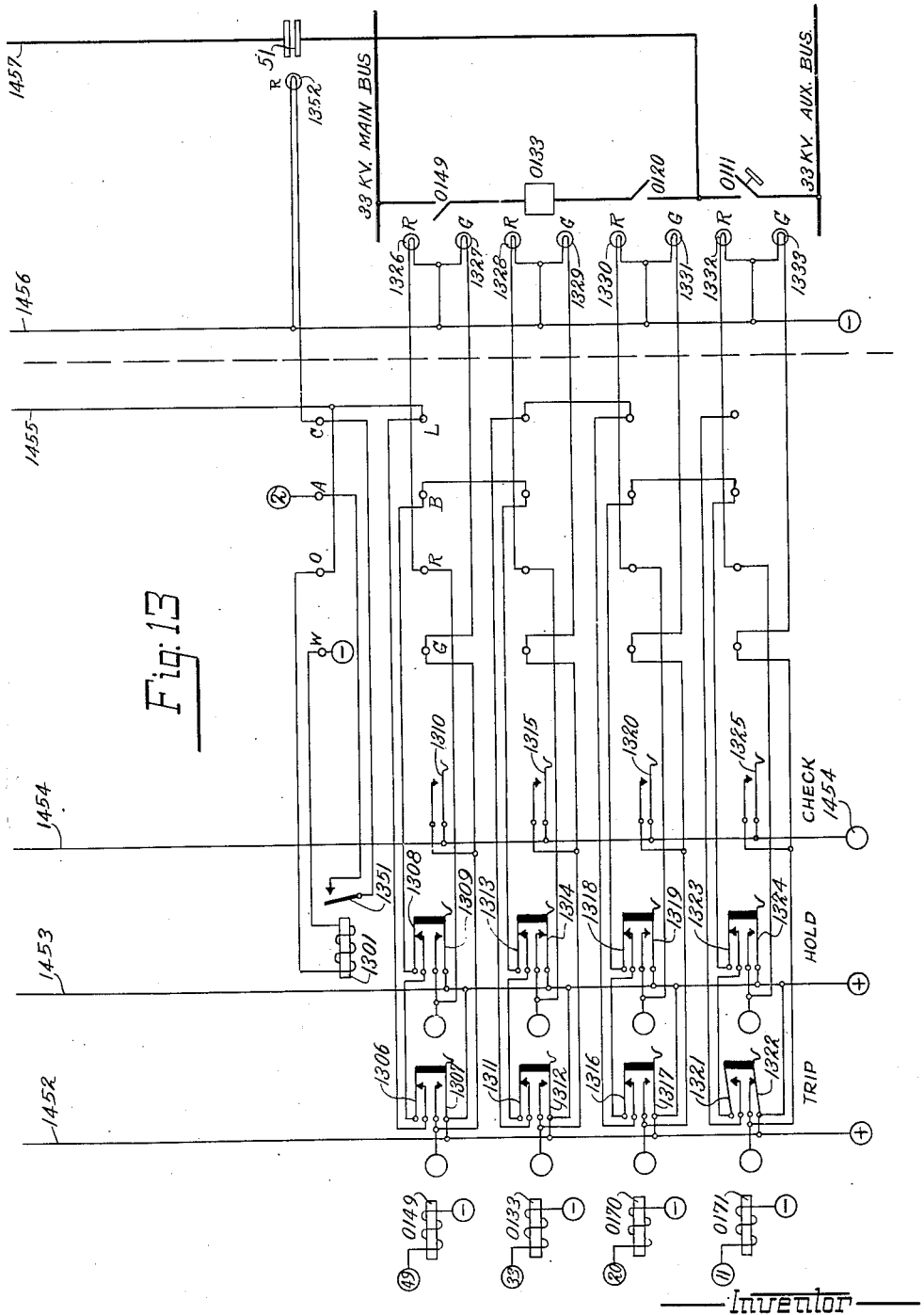

In Figs. 13 and 14 the spring mechanisms of a number of these notching relays are shown, however, the cams are omitted, as from the explanation of the operation of the device as shown in Fig. 10, the further operation of the various spring combinations as shown in Figs. 13 and 14 will be readily understood.

The spring combinations in Figs. 13 and 14 on each notching relay are designated trip, hold, and check.

In order to illustrate the manner in which a notching relay is caused to control its lamp signal unit on the dispatcher's board a portion of the one line diagram and the electrical circuit for controlling the operation of certain of the lamp signals is diagrammatically shown in Figs. 13 and 14.

Figure 3:
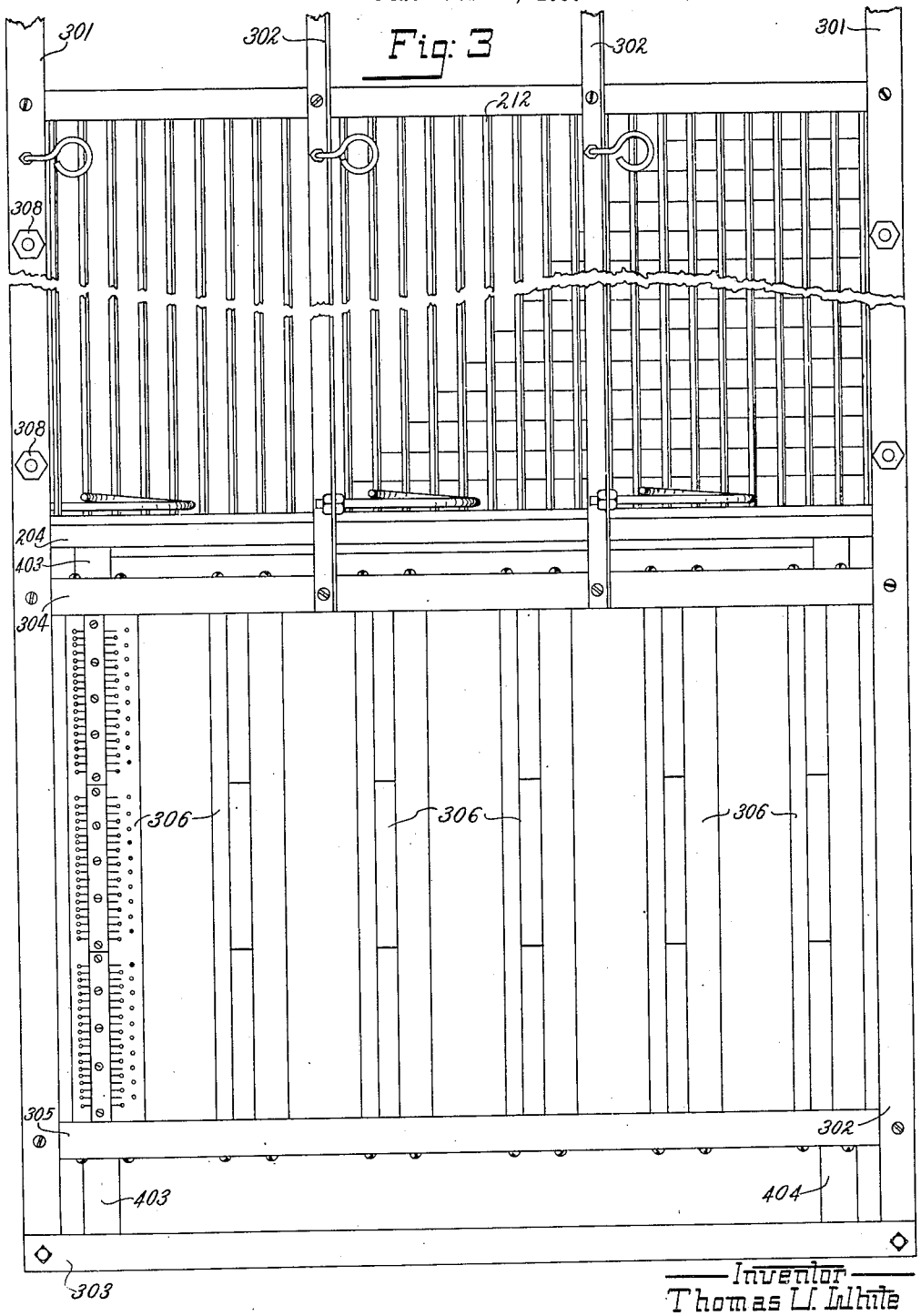

The wiring from the spring contacts of the notching relays is connected to terminal strips at the bottom and rear of the dispatch board such as shown in Fig. 3. In Figs. 13 and 14, only the terminals of the terminal strip are shown, and it is seen that from this point connections are made to the lamp signals associated with the one line diagram in the face of the board, and that a means is provided for strapping certain terminals in various combinations in order to provide circuits for the energization of the various relays used in the tell-tale signal circuits.

The circuits by which the stepping magnets of the notching relays are energized will not be described at this time, since we are only concerned with the operations of the circuits which control the lamp signal indications of the one line diagram. The circuits shown in Figs. 13 and 14 are typical of those used to operate the signals on the one line diagram illustrated in Fig. 1, and are specifically those used to operate the signals included in the dotted rectangle of Fig. 1.

Since a generator is a source of energy supplied to the power system, the signal circuits of the one line diagram are so arranged that when the switches are closed to connect energy from the generator to the bus or lines, one side of energy supplied for the relays controlling the tell-tale circuits is connected similarly to the signalling circuits of the one line diagram.

The generator symbol G2 is illuminated by the red lamp to indicate that energy from the generator G2 is supplying the system. The red lamp mounted in the rear of the generator symbol G2 is energized over a path which extends from positive battery at terminal A, armature 1414 and its front contact, filament of the red lamp 1401 to negative battery over conductor 1456. Relay 1415 is energized over the path which extends from positive battery at terminal L, working contact and armature 1424 on notching relay 0100, working contact and armature 1425, terminal B, strapped to terminal O of the relay circuit 1415 and winding of relay 1415 to negative battery. The relays and lamp signals of an equipment of this type are usually designed for operation on 44 or 48 volts, supplied from a storage battery.

The relay 1301 controls the lamp signal 1352, associated with the symbol representing the transformer bank 51. The transformer symbol 51 is dark, indicating a hot or live transformer. Relay 1301 is energized over a path which extends from positive battery at terminal L, make contact and armature 1424, make contact and armature 1425, armature and make contact 1429, armature and make contact 1427, conductor 1427', conductor 1432', make contact and armature 1432, make contact and armature 1434, armature and make contact 1439, armature and make contact 1437, make contact and armature 1442, make contact and armature 1444, conductor 1455, and winding of relay 1301 to negative battery. The relay 1301 is energized over this path to maintain the armature 1351 attracted, and the circuit of the lamp signal 1352 associated with the symbol 51 open.

It will be seen from the circuit drawings just traced that the circuits for energizing the relays in the tell-tale signal circuit are completed through the contacts of the notching relay devices in such manner that when the cams on the notching relays engage the spring contacts in either the trip or hold position the circuit is broken for effecting the deenergization of the relays as just described. The actual power mechanisms close circuits for supplying energy to the various lines and feeders of the power system through the contacts of the switching devices in series, and in a like manner the circuits for effecting the energization of the relays in the telltale circuit is completed through the contacts of the notching relays controlling the symbolic signal devices representing the power switching devices.

The wiring from the notching relays is carried to a terminal strip as previously described in a manner to permit the strapping of the contacts in such manner as to make possible circuits for energizing, or deenergizing tell-tale relays throughout the entire set up of the circuits of the one line diagram.

The by-pass switch 0156 is maintained normally open in the operation of the power system. The purpose of this switch is to by-pass the circuits of the oil switch 0174 so as to supply energy from the 2300 volt bus to the line conductor 1457 when the oil switch 0174 and disconnect switches 0189 and 0160 are open. It will be seen, by reference to the drawing Fig. 14, that the contacts and armatures 1447 and 1449 on notching relay 0156 are arranged to short-circuit the contacts on notching relays 0189, 0174, and 0160 when the notching relay 0156 is in the closed position.

Figs. 11 and 12 illustrate the apparatus and circuits of the equipment required for the selection and operation of the stepping magnets of the notching relay devices such as 0100, 0192, 0189, and 0174 as shown in Figs. 13 and 14.

Although Fig. 15 illustrates diagrammatically, certain circuits used in connection with the telltale indications caused by the selection of notching relays, to simplify the description of operation of the signalling circuits, we will first confine the explanation of the selection and operation of the signalling devices associated with that portion of the one line diagram illustrated in Figs. 13 and 14.

Referring now to Figs. 13 and 14, it will be seen that the red lamp 1401, associated with the symbol designated G2, is energized to indicate that the generator is supplying energy to the power system. The green lamp 1413, associated with the switch symbol 0156, is energized to indicate that this switch is in its open position. The green lamp 1333, associated with the symbol 0111, is also energized to display a green indication on this symbol, and to so indicate that this switch is open.

It has been the usual practice of the utility companies to devise a scheme for designating the power switching equipment, in a manner which will add intelligence to their operating scheme. Therefore, they usually provide a code numbering scheme, which will indicate the sections of lines controlled by the various switching devices and also indicate the various switches which comprise a given switch group which may be used in the control of any section of the line. Therefore, up to the present time it has not been practical to designate the symbols on the dispatcher's board to agree with the designations used on the physical equipment, and the numbering scheme used on the dispatcher's board is one that provides a simple scheme for selecting notching relays and associated signal devices.

For purposes of simplifying the explanation of the operation of this invention, however, let us assume that the designations on the symbols representing the various switching equipment agree with the designations on the actual physical equipment used in the field.

In Figs. 13 and 14 a method of terminating the wiring from the contacts of the notching relays or terminal strips is illustrated by the contacts, such as G, R, B, L, and C, which represent contacts on said terminal strips. The circuits of the notching relays are so terminated in order to permit the installation of tie wires between circuits at the terminal strips and the use of cross-connecting wires for connecting the various lamp signals to any desired notching relay circuit. In describing the operation of the circuit as shown in Figs. 13 and 14, however, reference to these contacts, as shown, will be omitted.

The red lamp associated with the symbol G2 is energized over a path which extends from positive battery, armature 1414 and its front contact, filament of the lamp signal 1401, conductor 1456, to negative battery.

The green lamp signal 1413 associated with the symbol 0156 is energized over a path which extends from positive battery, on conductor 1452, armature 1448 and its working contact, filament of lamp signal 1413, and conductor 1456, to negative battery.

The lamp signal 1333 associated with symbol 0111 is energized over a path which extends from positive battery on armature 1322 and its working contact, and filament of lamp signal 1333 to negative battery.

Since no circuits are closed at the contacts of the notching relays which control the energization of the lamp signals associated with symbols 0100, 0192, 0189, 0174, 0160, 0120, 0133, and 0149, these symbols are dark and indicate closed circuits carrying the energy from the generator G2 through the transformer bank 51 to the 33 kilovolt main bus illustrated in Fig. 13.

The transformer symbol 51 is also dark since the energizing circuit of lamp signal 1352 is open at contacts of relay 1301.

With the set-up of the circuits shown in Figs. 13 and 14 the dispatcher has an indication that the circuits connecting the generator G2 are closed to supply energy to the power system.

Now let us assume that the dispatcher desires to take the generator G2 off of the system, but before doing this it may be well to mention that the physical equipment indicated by the symbols shown on the one line diagram are simply circuit switching devices which open or close contacts in series to carry energy from point to point in the power network. The oil circuit breakers are usually devices capable of being operated by certain relay circuits associated with them on predetermined overload, underload, reversed power, or a number of other faults which may occur in the power system. These oil switches trip-out under certain predetermined conditions due to this relay operation to isolate certain portions of the system, and to protect apparatus and circuits of the power network.

In order to select the notching relay which will enable the dispatcher to control the signal circuit associated with the symbol 0192, which represents the oil switch that it is desired to open in order to take the generator G2 off of the system, the dispatcher will first operate the key K1 located on his desk, which will connect the calling device CD1 to the desired selecting circuit.

As a result of the operation of the key K1, there is a circuit completed extending from positive battery at contacts of the calling device CD1, contacts of the key K1, back contact and armature 1120, and winding of relay 1100 to negative battery. The relay 1100 is energized over this path.

As one result of the energization of the relay 1100 there is a circuit completed which extends from positive battery at armature 1121 and its front contact, upper winding of relay 1102, back contact and armature 1158, and winding of resistance 1191 to negative battery. The relay 1102 is energized over the path just traced.

As a further result of the energization of the relay 1100, certain circuits are completed at armatures 1123 and 1124 which will be explained in connection with the description of the manner in which the same selective equipment may be operated by one or more calling devices and associated keys located at a plurality of dispatcher's positions.

As a result of the energization of the relay 1102 in the manner above described, there is a circuit completed which extends from positive battery at the contacts of calling device CD1, through contacts of the key K1, front contact and armature 1126, conductors 1126' and 1169', armature 1169 and its back contact, and the winding of relay 1110 to negative battery.

Upon the energization of relay 1110, a circuit is completed from positive battery at armature 1168 and its back contact, armature 1167 and its front contact, and the winding of relay 1111 to negative battery.

The relay 1111, upon energizing, completes a holding circuit for the relay 1102, which extends from positive battery at armature 1159 and its front contact, conductor 1159', armature 1124 and its contact to the lower winding of 1102 to negative battery; a branch of this circuit also extends by way of armature 1130 and its front contact to the winding of relay 1101 and negative battery, causing 1101 to energize and open the circuit of relay 1100, permitting it to restore. The relay 1111, also, at its armature 1158 opens the energizing circuit of relay 1102, thereby placing this latter relay under control of relay 1111.

The selector switches S1 and S2 are mechanically of the well known vertical and rotary type commonly used in automatic telephone systems, which operate their wipers vertically in response to the first train of impulses received, and then operate the same wipers horizontally upon receiving the second train of impulses. It is believed that the structure of these switches is too well known to require a detailed description in this specification. The control circuits have, of course, been modified in accordance with the invention.

As a further result of the energization of the relay 1101 as previously described, the circuits of the key K2 are connected through the contacts of relay 1102 to the circuits of the selector S1, at armature 1119 and its contact.

In order to select the notching relay associated with the symbol 0192 the operator must now operate his dial device in the well known manner to transmit the digits 0192 in the order mentioned.

Since 0 has the value of ten impulses the contacts of the calling device CD1 will be opened and closed ten times in the transmission of the first set of impulses. As a result, the energizing circuit of the relay 1110 will be opened and closed a corresponding number of times.

The relay 1111 is of the well known slow-to-release type and will maintain its armatures attracted during the transmission of the impulses to the vertical and rotary magnets, as its slow-to-release action is adjusted to cause it to maintain its armatures energized when its operating circuit is interrupted at a speed equal to that of the calling device CD1.

When the calling device CD1 opens its contacts the first time the relay 1110 is deenergized and a circuit is completed which extends from positive battery at armature 1168 and its back contact, armature 1167 and its back contact, armature 1164 and its front contact, contact 1162 normally made with contact 1161 of the off-normal springs O. N. of the selector, winding of the slow release relay 1112, and the winding of the vertical magnet V1 to negative battery.

The vertical magnet V1 is energized over the path just traced, and as a result the wiper shaft of the selector switch S1 is raised one notch adjacent the first level of its bank contacts.

The relay 1112 is energized in series with the vertical magnet V1, and remains energized during the transmission of the first train of impulses to the selector switch. As a result, the circuit of the rotary magnet R1 is maintained opened at armature 1160 and its back contact.

As a further result of the energization of the vertical magnet on the first impulse and the operation of the wiper shaft as above described, the off-normal springs O. N. are actuated and the contact between armature 1161 and contact 1162 is broken, while at the same time a circuit is completed which closes the contact between springs 1162 and 1163. Since the relay 1112 is energized at this time there is now an auxiliary circuit completed through contacts 1162 and 1163 to continue the energization and deenergization of the vertical magnet V1 during the transmission of the remaining impulses comprising the first digit.

When the contacts of the calling device CD1 are again closed at the end of the first impulse the circuit over which relay 1110 is energized is again completed and as a result the energizing circuit of the vertical magnet V1 is broken at armature 1167 and its back contact. The vertical magnet now operates its pawl and ratchet mechanism in such position that the next impulse will raise the wiper shaft another notch or to the second level of the contacts selectable by the switch wipers.

The remaining impulses comprising the first digit are transmitted in a similar manner which results in raising the wiper shaft in such position that the switch wipers are in line with the tenth level of its back contacts.

At the end of the train of impulses comprising the first digit, the contacts of the calling device CD1 are maintained closed and as a result the relay 1110 remains energized to in turn hold the relay 1111 energized.

The interval between the transmission of the first and second digits is sufficient, however, to cause the release of the armature on the relay 1112, since its energizing circuit is open for an appreciable interval of time between impulse series at armature 1167 and its back contact.

The relay 1112 was first energized through the contacts of the off-normal switch 1161 and 1162 which are at this time open and when the relay 1112 retracts its armature 1160 during the interval between the first and second impulses there exists no further circuit to cause the energization of relay 1112 or of the vertical magnet V1.

As a result, when the dispatcher dials the second digit the wiper shaft of the switch S1 is operated in a rotary movement, due to the energization of the rotary magnet R1, as when the relay 1110 is deenergized a circuit is completed extending from positive battery and armature 1168 and its back contact, armature 1167 and its back contact, armature 1164 and its front contact, off-normal springs 1162 and 1163, armature 1160 and its back contact, and the winding of the rotary magnet R1 to negative battery. The rotary magnet rotates the wiper shaft in a horizontal direction, causing the wipers 1173, 1174, and 1175, to be moved to engage the bank contacts 1176, 1177, and 1178, respectively.

It is to be assumed that these are the first ones of those located in the tenth level, of the switch bank associated with the selector S1. The remaining bank contacts are omitted since the construction of a switch of this type is generally well known.

The contacts of the calling device CD1 remain closed at the end of the transmission of the impulses comprising the second digit, and as a result the relay 1110 remains energized until certain circuits are completed by the wipers of the selector.

It will be noted that each time the relay 1110 was deenergized during the transmission of impulses to the rotary or vertical magnet, a circuit was completed which extended from positive battery at armature 1168 and its back contact, armature 1167 and its back contact, armature 1164 and its front contact, and the winding of relay 1114 to negative battery.

The relay 1114 is of the slow-to-release type and, therefore, remains energized during the transmission of the impulses comprising the first and second digits to maintain the circuits of the wipers 1173, 1174, and 1175, open at the back contacts of armatures 1172, 1171, and 1170, respectively.

During the interval between the second and third impulses there is a circuit completed which extends from positive battery at contacts of the calling device CD1, contacts of the key K1, front contact of armature 1126, over conductor 1126', armature 1172 and its back contact, wiper 1173, bank contact 1176, conductor 1187, and the winding of relay 1201 to negative battery.

Upon the energization of the relay 1201, a circuit is completed for relay 1202 at armature 1214 and its front contact.

Relay 1202 upon energizing at its armature 1215 applies positive battery to relay 1113 by way of conductor 1188, bank contact 1177, wiper 1174, back contact and armature 1171, and winding of relay 1113 to negative battery.

Relay 1113 upon energizing, at its armature 1168 and its front contact, completes an energizing circuit for relay 1111 which is independent of contacts 1167, and at its armature 1169 brings about the deenergization of relay 1110.

From the foregoing it will be seen upon termination of transmission of the second series of impulses relay 1201 of switch S2 is substituted for 1110 of S1.

As the contacts of the calling device CD1 are opened and closed during the transmission of the third digit, relay 1201 is deenergized and energized in turn 9 times in correspondence with the third digit of the number of the notching relay being selected.

When the contacts of the calling device CD1 are opened on the first impulse the relay 1201 is deenergized, and as a result a circuit is completed from positive battery at armature 1214 and its back contact, armature 1216 and its front contact, contacts 1220 and 1219 of the off-normal switch O. N. through the windings of relay 1203, vertical magnet V2 in series to the negative battery. The relay 1203 and vertical magnet V2 are energized over this path. Upon the energization of V2 the off-normal springs operate to open the original energizing circuit of relay 1203 and magnet V2, and to provide a substitute circuit by way of the springs 1221 and 1220, and armature 1222 and its front contact, which maintains the relay 1203 energized throughout the remainder of the impulse train.

The mechanical structure of the switch S2 is identical with that of the switch S1 and the operation of the wiper shaft due to the energization of the vertical magnet V2 is identical to that previously described in connection with the operation of the switch S1.

As a result of the operation of the vertical magnet of the switch S2 the wipers 1228, 1229, and 1230 are raised to a position opposite its ninth bank contact level.

As another result of the deenergization of the relay 1202, each time the contacts on the calling device CD1 are broken, there is a circuit completed to cause the energization of slow-to-release relay 1204, over a path which extends from positive battery at armature 1214 and its back contact, armature 1216 and its front contact, winding of relay 1204 to negative battery. In this manner the circuits of the wipers 1228, 1229, and 1230 are maintained open during the transmission of the impulses comprising the third and fourth digits.

During the interval between the third and fourth digits, the slow-release relay 1203 retracts its armature 1222. Since there is now no further circuit to cause the energization of this relay, it remains deenergized during the transmission of the fourth digit.

During the transmission of the impulses comprising the fourth digit the relay 1201 is energized and deenergized as before, however, due to the deenergization of the relay 1203, the transmission of the fourth set of impulses results in the operation of the rotary magnet R2, from positive battery at armature 1214 and its back contact each time relay 1201 is deenergized, armature 1216 and its front contact, spring contacts 1220 and 1221 of the off-normal switch, armature 1222 and its back contact, and the winding of rotary magnet R2 to negative battery. In this manner the rotary magnet is caused to rotate its wipers 1228, 1229, and 1230 to the second row of contacts, 1228', 1229', and 1230' in the ninth level.

The relays 1201 and 1202 remain energized at the end of the transmission of the impulses comprising the fourth digit, consequently the energizing circuit of the slow-to-release relay 1204 is maintained open at armature 1214 and its back contact, and therefore retracts its armatures after a slight interval of time to close through the circuits of the wipers 1228, 1229, and 1230, at their back contacts. As a result of the operation of the switch mechanisms S1 and S2, just described, the circuits of the notching relay 0192 are connected to the controlling key K2 located at an operator's position No. 1.

It is desirable that a dispatcher have means of verifying the operation of the selective devices to determine whether he has selected the correct switch symbol for operation, and means are provided in the invention enabling the dispatcher to identify the switch symbol which he has selected as a result of the operation of the selective devices just described.

To identify the selected symbol before causing its operation, the operator now actuates the lever or key K2 in such a manner that the lever springs 1138 engage their working contacts.

As a result of the operation of the key K2 in the manner described, there is a circuit completed which extends from negative battery at the winding of resistance 1199, contact and armature 1138 of the key K2, contact and armature 1119, and armature 1131 and its contact, conductor 1131', contact and armature 1170, wiper 1175, bank contact 1178, conductor 1189, and the winding of the polarized neutral relay 1206 to the middle point in the storage battery and thence to positive battery. As shown on the drawings the polarized relay 1206 normally maintains its armature 1207 in a neutral position. However, when the relay is magnetized by current flowing in the direction just traced the armature 1207 is energized in such manner as to close a contact between the armature and its front contact 1208.

Upon the energization of the relay 1206 in the manner described, an energizing circuit is completed from positive battery at armature 1207 and front contact 1208, through the winding of relay 1205 to negative battery. The motor 1213 maintains the commutators 1212, 1211, and 1210, of the interrupter shown in Fig. 12 constantly operating. As a result, the interrupter 1212 intermittently connects positive battery to its brush and armature 1223.

Therefore, upon the energization of relay 1205, in the manner previously described, a circuit is completed from positive battery interrupted at commutator 1212, armature 1223 and its front contact, armature 1225 and its back contact, wiper 1228, bank contact 1228', conductor 192, filament of the lamp 1405, and conductor 1456 to negative battery. The interrupter segment 1212 is designed to interrupt the positive battery connection to this circuit at a speed of approximately 120 times per minute. The green lamp signal associated with the symbol 0192 is intermittently energized over the path just traced to cause the green lamp to give a flashing signal on the symbol 0192.

As a further result of the energization of the relay 1205 there is a circuit completed extending from positive battery interrupted by the commutator 1210 of the interrupting device, armature 1224 and its front contact, armature 1227 and its back contact, wiper 1230, bank contact 1230', conductor 292, filament of the lamp signal 1404, and conductor 1456 to negative battery. The lamp signal 1404 associated with the symbol 0192 is intermittently energized over the path just traced at a speed of approximately 20 times per minute.

As a result of the circuit just traced it will be seen that the red and green lamp signals are intermittently energized to cause the alternate flashing of red and green lamp signals on the symbol 0192. In this manner the dispatcher identifies the symbol that has been selected for control through the medium of its associated notching relay device.

Having checked the accuracy of the selecting devices and identified the selected switch symbol as the one desired for control, the operator now restores the lever of the key K2 to its normal position. As a result the polarized neutral relay 1206 restores its armature to the position shown in Fig. 12, thereby opening the energizing circuit and causing the deenergization of relay 1205 to open the circuits over which the lamp signals 1405 and 1404 were energized.

The one line diagram as illustrated in the drawings describing this invention is of the simplest form in order that the invention may be more readily described. It is to be appreciated, however, that the circuits of the power network are decidedly complex and, therefore, the one line diagram may also be very complicated. As a result it is very desirable that a means be provided which enables the dispatcher to identify any signal unit on the face of the dispatch board that it is desired to control, before he operates the controlling keys for the selected signal, in order that a false set-up may not be obtained which will further complicate the operation of the dispatcher's board, and convey a false indication to the second operator who may be on duty as to his intentions, as if an incorrect selection were made and the switch signal operated, it is possible that the dispatcher's board may display a certain tell-tale indication which would be incorrect but which would attract the attention of the other operators on duty and cause them to make some incorrect move in issuing switching instructions to the field.

To operate the stepping magnet of the notching relay 0192 so as to set up the desired signalling indications on the switch symbol 0192, the operator will now operate the lever of the key K2 in the opposite direction to complete a circuit from positive battery at lever spring 1139 over the previously traced path to the polar relay 1206, to cause it to attract its armature 1207 in the direction to close the connection between it and front contact 1209.

There is now a circuit completed which extends from positive battery at armature 1207 and its front contact 1209, armature 1226 and its back contact, wiper 1229, bank contact 1229', conductor 92, and the winding of the stepping magnet 0192 to negative battery. The cam arrangement on the notching relay device is such as to provide for movement of the three spring combinations shown to four different positions. The cams are in their fourth position when in the position illustrated in Fig. 14. This energization of the stepping magnet 0192 causes the cams to be rotated one step. The order of operation is such that the lever spring 1428 makes contact with its upper contact spring, while the lever spring 1427 is caused to break contact with its lower spring.

It will be seen that a momentary operation of the key K2 is all that is necessary in order to cause this operation of the notching relay, and that each succeeding operation of the key K2 results in a movement in the established order of the relay cams and the springs associated therewith.

As a result of the operation of the notching relay just described a circuit is completed from positive battery on conductor 1452, lever spring 1428 and its working contact, conductor 192, filament of lamp signal 1405, and conductor 1456 to negative battery. The lamp signal 1405 is energized over this path to display a green signal indication on the symbol 0192 which indicates that the symbol is in the open or tripped position. As a further result of the operation of the notching relay, as described, a point in the previously traced energizing circuit of the relay 1301 is open at lever springs 1427 and its back contact.

Upon the deenergization of the relay 1301 there is now a circuit completed which extends from positive battery at the segments of interrupter 1212, conductor 2, back contact and armature 1351, and filament of the lamp signal 1352 to negative battery. As a result the lamp signal 1352 is intermittently energized to display a flashing red signal indication on the symbol 51.

This flashing indication on the transformer bank 51 indicates to the dispatcher that as a result of the operation which would open the oil switch 0192 there would be a loss of energy to the system which would effect the 33KV transmission circuit. It is, therefore, necessary for the operator to make certain that there is another source of energy supplying the 33KV portion of the system which might be effected by the operation of the oil switch 0192, before he issues instructions to the distant power plant over his telephone circuit to cause the actual operation of the oil switch 0192.

Assuming now that the dispatcher has determined that it is satisfactory to proceed with the instruction to trip the oil switch 0192. He first sets up an indication on the dispatcher's board that will convey intelligence to the remaining operators on duty and act as a check on his own memory that an instruction has been issued for the operation.

To set up this indication he again operates the key K2 in the same manner as before described to close the circuit between armature 1207 and its front contact 1209, and to cause the energization of the stepping magnet 0192. He operates the key K2 the required number of times to cause the cam on the notching relay to engage the lever spring 1431, and to close contact between this spring and its working contact. As a result there is now a circuit completed from positive battery on the commutator of the slow-speed interrupter 1211, conductor 1454, conductor 1454', lever spring 1431 and its contact, conductor 192, filament of lamp signal 1405, and conductor 1456 to negative battery. The lamp signal 1405 is intermittently energized by the operation of the slow-speed interrupter 1211 over the path just traced. It will be seen that the dispatcher may leave this indication up to maintain the lamp signal associated with the symbol 0192 flashing in this manner so long as desired.

It is true that the dispatcher may find it necessary to maintain this signalling indication which designates that he has issued an order for operating the oil switch 0192, for quite some period of time. It may be necessary that he use the long distance telephone in order to obtain the connection with the distance operator who is in a position to perform the switching operation. Again it is necessary in most instances that the operator leave the telephone and walk quite some distance to perform the operation. As a result of the delay which is occasioned, the dispatcher may wish to use his selecting devices for setting up other indications on the dispatcher's board indicative of the postion of switching apparatus as the result of information received from the field forces reporting to his office or as a result of orders issued by his office for the operation of certain other switching mechanism. He will, therefore, release the connection with the apparatus controlling the signal 0192 on the dispatcher's board and restore all of the selecting apparatus to its normal position.

To do this it is only necessary that he restore the locking key K1 to its normal position, thus opening the energizing circuit of the relay 1201. When relay 1201 is deenergized the energizing circuit of the relay 1202 is opened at armature 1214 and its front contact, while at armature 1214 and its back contact, one point in the circuit for operating the release magnet is completed.

The relay 1202 is slow-to-release but retracts its armature after a slight interval of time to close the circuit of the release magnet RS2, through off-normal springs 1218, closed on the initial movement of the switch. Due to the energization of the release magnet RS2 the pawl and ratchet devices associated with the vertical and rotary magnets are operated to disengage the wiper shaft and the switch wiper shaft takes first a horizontal back movement and then drops vertically to its normal position. When the wiper shaft reaches its normal position all the off-normal contacts are restored to their normal position, and the circuits of the switching device S2 are restored to normal.

As a further result of the deenergization of the relay 1202, the energizing circuit of the relay 1113 is opened at armature 1215.

The relay 1113, upon deenergizing, at armature 1169 again prepares an operating circuit for relay 1110, at the front contact of armature 1168 opens the circuit of relay 1111, and at the back contact prepares a point in the circuit of release magnet RS1. The relay 1111 retracts its armatures after a slight interval and at armature 1164 and its back contact completes the circuit of release magnet RS1.

The off-normal springs on this switch operate in the identical manner as described in connection with the operation of the switch mechanism S2, and as a result of the energization of the release magnet RS1 in the manner described, the wiper shaft associated with the switch S1 is restored to normal in the same manner as that described in connection with the release of the switch mechanism S2. The switch mechanism S1 is in this manner restored to its normal position.

As a result of the deenergization of the relay 1111 the holding circuit of the relay 1102 is opened at armature 1159 and relay 1102 is deenergized. At the same point the energizing circuit of the relay 1101 is opened and this relay is deenergized. The result is that all of the circuits in connection with the operation of a selecting equipment are opened and all equipment is restored to its normal position.

In order that the selecting and operating circuits may be made available to more than one operator for the purpose of operating the signals on the dispatcher's board, a second switch mechanism, such as S1, may be associated with the operator's position through the circuits of the relays 1103 and 1108 by connection to the conductors 1191 to 1194, inclusive.

In a similar manner another switch mechanism, such as S1, may be connected by means of the conductors 1190, 1195, 1196, and 1197 to the circuits of the relays 1104, and 1109.

It is not necessary to add additional switching mechanisms, such as S2, as the bank contacts of the selector switches, such as S1, may be in multiple, that is, the conductors 1187, 1188, and 1189, may be multipled to corresponding contacts on the banks of each of the switch mechanisms, such as S1.

The operator's equipment in each case consists of the keys, such as K1 and K2, and the calling device, such as CD1. These devices are wired in the manner shown to the circuits of the relays, such as 1100 to 1104, inclusive. The circuits of the second operator's devices are similarly connected to another group of relays, such as 1105 to 1109, inclusive. With the circuit arrangement as shown and additional switch mechanisms, such as S1, associated with the conductors 1191 to 1194, inclusive; and conductors 1190 and 1195 to 1197, inclusive, it is possible to add additional operator's equipment consisting of the calling device and the group of relays, such as 1100 to 1104, inclusive, without adding additional switching mechanism, such as S1, and to make possible operation of the selecting devices from any one of these operating positions.

Assuming for purposes of illustration that the switch mechanism, such as S1, has been selected in the same manner as previously described by the operator at position No. 1, and that the operator No. 2 desires to make a selection of apparatus located on the dispatcher's board at the same time.

When the operator at position No. 2 operates the key K3 he will complete a circuit from positive battery at the contacts of the calling device CD2, through contacts of the key K3, back contact and armature 1140, and the winding of the relay 1105 to negative battery.

Since the original energizing circuits of the relays 1102 and 1107 are open at armature 1158, due to the operation of the selector switch S1, the energization of relay 1105 cannot result in the energization of the relay 1107. However, a circuit is completed from positive battery at armature 1141 and its front contact, armature 1147 and its back contact, front contact and armature 1142, and winding of relay 1108 to negative battery on the armature of a relay, such as 1111 located in the circuit of the second selector switch, like S1. The relay 1108 will be energized over this path to complete the circuit to extend the circuits of the calling device and keys K3 and K4 to the circuits of the next selector switch. Relays 1105 and 1106 will then be energized in the same manner as that described in connection with the operation of the relays 1101 and 1100.

In a similar manner the relays 1104, and 1109 may be operated to pick-up the third selector switch and to connect the circuit from a third dispatcher's position to such switch.

From this it will be seen that additional operator's positions may be added by connecting a third, fourth, or fifth group of relays, such as 1102, and 1107 to the first switch, relays 1103, and 1108 to the second switch, and relays such as 1104, and 1109 to the third switch.

It will be readily seen from the circuits shown and description given that the selector S1 may be operated from either of the two operator's positions shown, and it will be clear from this that by the addition of the relays, such as 1100 to 1104, inclusive, for each operator's position added that the selector switch, such as S1, may be operated from any one of the added positions.

It will be seen that in case the selector switch S1 is connected to the contacts of the relay 1107 and to the circuits of the calling device CD2 and key K3, that it would not be possible to pick this same switch from the remaining operator's positions. This is due to the fact that at armature 1158 and its back contact, the original energizing circuits of the relays 1102 and 1107 are open when the selector switch is seized and the relay 1111 is energized.

It is desirable to establish several points from which the dispatcher's board may be operated in the same dispatching office, as it is desirable that supervisors be able to step into the office and operate the dispatcher's board without interfering with the work of the regular system operators, for the purpose of checking the advisability of making certain switching moves in the field.

Let us assume now that a dispatcher has received a report from the field that the oil circuit breaker 0192 has been opened. He now desires to set up that indication on the dispatch board. He will operate his keys and calling device in the same manner before described, the selecting devices S1 and S2 will be operated in the same manner previously described, and he will obtain the connection with the notching relay device 0192 in the same manner as previously described. He will then operate his key K—1 the necessary number of times to energize and deenergize the stepping magnet 0192, in such manner that the cams on the notching relay again engage the spring contact 1428 and actuate the lever springs in the same manner as before described in connection with the setting up of the steady green lamp signal indication on the switch symbol for the oil switch 0192.

I have described the usual procedure used in connection with the issuing of a switching instruction to the field attendants and the operation of the dispatcher's board in connection with the setting up of the "checking" indication, the identifying indication, and the "trip" or "open" indication.

For purposes of illustrating the operation of the notching relay circuit to set up the "hold" indication, let us assume that the operator desires to take the oil switch 0174 out of service for purposes of working on same. In order to clear the circuit of this switch in such manner that no energy from either direction can reach the switch while the men are working on it, he will also open the disconnect switches 0189 and 0160 and tag these switches or establish a blocking condition on them to prevent their operation without the consent of the dispatcher.

The usual procedure to be used in case the energy from the generator G2 is to be maintained connected to the power system, is to first close the by-pass switch 0156. The switching order issued to the field will require that the operation be performed in the sequence in which the order is given. The order would possibly read "close switch 0156, then open switch 0174, and open and block disconnects 0160 and 0189."

Upon receipt of information from the distant substation attendant that the order has been carried out the dispatcher will set the necessary signals on the dispatcher's board to indicate the condition and the details of the blocking. He first selects the notching relay 0156 and positions the cam mechanisms associated therewith in such manner that the lever spring 1448 breaks contact with its working-upper contact and the lever spring 1447 makes contact with its lower spring. As a result the green lamp signal 1413 is deenergized at contacts 1448 and the symbol 0156 becomes dark to indicate that the by-pass switch has been closed.

The dispatcher will now select the notching relay 0174 and actuate the stepping magnet associated therewith to cause the green lamp signal 1409 to be energized, and display a green indication on switch symbol 0174 to indicate that the oil switch is open.

The next operation requires the setting of the red lamp signal indication on the switch symbols 0160 and 0189.

The dispatcher first connects with and operates the notching relay 0160, in such manner that the lever spring 1445 closes circuit with its upper contact and the lever spring 1444 breaks the circuit with its lower contact.

As a result of this operation a circuit is completed from positive battery on conductor 1453, lever spring 1445 and its working contact, conductor 1445', filament of the red lamp signal 1410, and conductor 1456 to negative battery. The red lamp signal 1410 is energized over this path to illuminate the switch symbol 0160 with a steady red signal to indicate that this disconnect switch has been opened, and blocked, or tagged.

In a similar manner the dispatcher will select and operate the notching relay 0189 to cause the display of the red lamp signal on the switch symbol 0189. In this case the lamp signal 1406 will be energized over circuits completed at the contacts of the lever spring 1435.

The circuits over which the relay 1301 was formerly energized are now open at lever springs 1434, 1437, and 1444, however, these circuits have been by-passed and short-circuited at the contacts of the lever spring 1447.

Assuming now that the oil switch 0192 is closed and the energy from the generator G2 is connected to the power system through the by-pass switch 0156. There will be a circuit completed for the energization of the relay 1301 over a path which extends from positive battery at terminal L, back contact and armature 1424, back contact and spring 1425, conductor 1425', conductor 1429', lever spring 1429 and its back contact, lever spring 1427 and its back contact, conductors 1427' and 1447', back contact and lever spring 1447, back contact and lever spring 1449, conductor 1455, and the winding of relay 1301 to negative battery. As a result of the energization of relay 1301 the energizing circuit of the lamp signal 1352 is again opened, and the lamp signal 1352 on the transformer bank 51 is accordingly extinguished. Thus the dispatcher receives an indication that as a result of the closing of the by-pass switch 0156 energy has been maintained on the power system with the disconnect switches 0189 and 0160 opened and "blocked" in this position to permit work on the oil switch 0174.

It will readily be seen that it is important that neither of the disconnects 0160 or 0189 be again closed while men are at work on the oil switch 0174, and the setting up of the red lamp signal before the dispatcher is an indication to him that he has men working on the circuits of the oil switch and that he must obtain a clearance from the foreman supervising the work, before he again cuts the oil switch back into service. It is also necessary for him to test the operation of the oil switch and its associated relay circuits before it is cut back into service. For this reason it is very important and desirable to have the "hold" or "blocked" indication on the dispatcher's board.

It will be noted that the tell-tale signal circuits on the transformer bank, such as that illustrated in connection with the transformer symbol 51, are made operative by the break contacts on the notching relays in the "trip" position and the "hold" position.

The circuit description up to this time has been restricted to the control of that portion of the symbolic equipment included within the dotted rectangle in Fig. 1, and controlled by the circuits disclosed in Figs. 13 and 14 when selected by apparatus and circuits such as disclosed in Figs. 11 and 12.

In order to make clear the further operation of the tell-tale signal circuits a diagrammatic drawing showing the method of connecting the circuits of the notching relays for obtaining tell-tale indications on the entire one line diagram shown in Fig. 1, has been given in Fig. 15.

The single set of contacts shown for each switch symbol in Fig. 15 represent the break contacts on the "trip" and "hold" spring pile-ups of the notching relays. In order to more clearly indicate the operation of the tell-tale signalling circuits the high voltage lines in Fig. 15 have been connected to additional sources of energy as shown by the connection to positive battery at the generators G1 and G2 at "Easton" and at the interconnections from another system at "State line" and "Bethlehem" switching stations.

Contacts shown closed represent those normally closed through the switches indicated in Fig. 1, while those shown open represent the bypass switches and the normally open connections to auxiliary buses, etc. It will be readily seen that under the conditions shown in Fig. 15 many combinations of operations may be performed without a loss of energy on the transmission system, which loss would be indicated by a flashing signal on the transformer bank.

For instance, it will be seen that the transformer bank 52 between Noel and Noel Junction may be maintained live with switch 0117 at Noel Junction open if 0115 is closed before 0117 is opened.

And that the bank 56 at Laos may be energized from either line 1 or line 2 by operation of switches controlling contacts 0131 and 0132.

The generators G1 and G2 at Easton may be taken off the system by opening switches 0192 and 0292 and the system still kept live and supplying energy from the interconnections at "Bethlehem switching station", and "Stateline switching station."

Should the switch 0123 at Webster bank 53 be opened, however, the relay 1501 will be deenergized. A circuit is then completed at armature 1502 and its back contact, to cause the flashing of the red lamp signal 1503 of the bank symbol 53, to indicate a loss of energy on bank 53 feeding Webster.

Similarly, switches may be opened to cause deenergization of relays and flash on banks 54, 55, 56, 52 etc. in a manner obvious from the above explanation.

What is claimed is:

1. In equipment for use in connection with a power distribution system, an electrified chart including a one line diagram representing the power network and containing symbols representative of the interconnected pieces of equipment in the system and their condition or position, signals for changing the representation of each symbol, a single means for each of certain of said symbols common to the signals thereof operable under control of a dispatcher to change the condition of their associated signals to change the represented position on a symbol of a piece of equipment of the power distribution system, and circuits and apparatus jointly under the control of said means, influenced in accordance with the means actuated, to change the condition of other of said signals to illustrate on the chart the effect in the power system which would be brought about by a change in the position of a piece of equipment now represented by such chart as having changed its position.

2. In an arrangement of equipment for use in conjunction with a power distribution system, an electrified display board illustrating by a one line diagram and by electrified symbols, the network and apparatus and possible conditions of the apparatus of the power distribution system step-by-step symbol display control devices associated with certain of said symbols, dispatcher controlled means for extending connections to said devices, means controlled by the dispatcher for readily identifying the symbol selected and the condition such symbol represents the apparatus represented by it as being in and means for permitting him to then operate the sep-by-step device connected with to modify the electrical condition of said symbol so that when it is again selected and identified it will represent a condition of the apparatus represented by it different than that represented by it when formerly identified.

3. In a signalling system, a symbol representing a piece of switching apparatus having "tripped open", "closed", and "hold open" conditions, lamps associated with said symbol, circuits for said lamps, means for closing one or another of said circuits or for holding all said circuits open to cause said symbol to represent any one of the conditions specified, an additional circuit for one of said lamps, and means for closing said additional circuit to identify the symbol selected from other similar associated symbols.

4. In a signalling system, a display symbol, a plurality of differently colored lamps associated with said symbol, circuits and apparatus for energizing one of said lamps continuously or intermittently and for energizing the other of said lamps continuously, electrical means for closing and holding closed any one of said circuits to cause said symbol to display a distinctive indication in accordance with the circuit closed, independent of a subsequent disconnection of current from said electrical means, said means having contacts individual to each of said respective circuits.

5. In a power dispatcher's system, a chart containing symbols representing different pieces of apparatus in a supervised power network, a one-line diagram representing the interconnecting lines of the power network connecting the various symbols; circuit switching devices, there being one individual to each symbol, means for directively operating any device at will to cause the symbol to which it is individual to indicate any desired one of more than two possible conditions the apparatus represented may assume, other symbols for indicating the electrical condition of said interconnecting lines and still others representing apparatus not represented by the first or second mentioned symbols, and operating circuits for said second and last mentioned symbols including said switching devices.

6. In an equipment for use in connection with a system of power distribution, a chart including a diagram representing the power network and containing electrically actuated symbols representing the interconnected switching equipment of the network and the charged or uncharged condition of the conductors of the network, multi-position step-by-step electromagnetic devices associated with each of the symbols representing switching equipment of the system, dispatcher controlled means for stepping any of said devices to condition their symbols to represent different conditions and positions of the switching equipment represented by them, and circuits and apparatus controlled jointly by said stepping devices to condition the symbols of the conductors to agree with the circuit changes resulting from the changes in position of the actual switching equipment as represented by the changed represented position of the switching equipment.

7. In a signalling system, a supervisory display chart having a diagram and symbols representing the operating equipment and other parts of a community service system; a multiposition step-by-step symbol display control device associated with each operating equipment symbol, dispatcher controlled means for operating the device of any operating equipment symbol in a step-by-step manner to cause the associated symbol to display any of many possible indications representative of various conditions in which the represented piece of equipment may be in, a plurality of control circuits for the various symbols of the other parts of the system, and contacts on said devices included in said control circuits modifying such circuits each time the position of any device of the system is changed.

THOMAS U. WHITE.